United States Patent [19]

Kessel et al.

[11] Patent Number: 4,822,687

[45] Date of Patent: Apr. 18, 1989

[54] SILICONE RELEASE COMPOSITIONS

[75] Inventors: Carl R. Kessel; Stephen W. Bany, both of St. Paul, Minn.

[73] Assignee: Minnesota Mining and Manufacturing Company, St. Paul, Minn.

[21] Appl. No.: 146,977

[22] Filed: Jan. 22, 1988

[51] Int. Cl.⁴ ............................................. C08G 77/20
[52] U.S. Cl. ..................................... 428/447; 528/31; 528/25; 528/15
[58] Field of Search ..................... 528/25, 15, 31, 448, 528/447

[56] References Cited

U.S. PATENT DOCUMENTS

| | | | |
|---|---|---|---|
| 2,607,711 | 10/1949 | Hendricks | 117/122 |
| 2,876,894 | 3/1959 | Dahlquist et al. | 206/59 |
| 3,055,774 | 9/1962 | Gilkey et al. | 117/143 |
| 3,328,482 | 6/1967 | Northrup et al. | 260/825 |
| 3,342,625 | 9/1967 | Grossman et al. | 117/68.5 |
| 3,527,659 | 9/1970 | Kell | 117/145 |
| 3,770,687 | 11/1973 | Mestetsky | 260/30.4 |
| 3,891,745 | 6/1975 | Bellan et al. | 423/462 |
| 3,997,702 | 12/1976 | Schurb et al. | 428/352 |
| 4,033,924 | 7/1977 | Mine et al. | 260/37 |
| 4,046,930 | 9/1977 | Johnson et al. | 427/387 |
| 4,279,717 | 7/1981 | Eckberg et al. | 204/159.13 |
| 4,313,988 | 2/1982 | Koshar et al. | 428/40 |
| 4,337,107 | 6/1982 | Eshleman | 156/249 |
| 4,343,855 | 8/1982 | Conder | 428/332 |
| 4,421,904 | 12/1983 | Eckberg et al. | 528/27 |
| 4,547,431 | 10/1985 | Eckberg | 428/413 |
| 4,576,999 | 3/1986 | Eckberg | 525/476 |
| 4,640,967 | 2/1987 | Eckberg | 528/26 |
| 4,684,709 | 8/1987 | Ona et al. | 528/15 |

*Primary Examiner*—Nancy A. B. Swisher
*Attorney, Agent, or Firm*—Donald M. Sell; Lorraine R. Sherman

[57] ABSTRACT

A composite structure comprises a substrate bearing on one or more surfaces a layer comprising an epoxypolysiloxane in which greater than 20% of the siloxane units are substituted by an oxiranyl group-substituted monovalent, non-cyclic, linear or branched aliphatic group. The composite structures can be adhesive roll and sheet materials in which the novel layer is a release coating.

23 Claims, No Drawings

SILICONE RELEASE COMPOSITIONS

FIELD OF THE INVENTION

This invention relates to composite structures comprising a layer of epoxypolysiloxanes and their blends with epoxy-terminated silanes which are useful as release coatings for adhesive roll and sheet materials.

BACKGROUND OF THE INVENTION

Coatings having specific release properties toward adhesives are widely used. Polydimethylsiloxanes and polymers containing predominately dimethylsiloxane units provide very low release coatings, e.g., they exhibit release of 4 to 16 grams per centimeter of width, for products such as labels or large sheets which contain normally tacky and pressure-sensitive adhesives. These polymers are less useful as release coatings on the back surface of adhesive tape (back surface coating of adhesive tape is known as "low adhesion backsize" (LAB)) because their low release force can cause roll instability. LABs for tapes in roll form ideally exhibit release toward the adhesive of about 60 to 350 g/cm of width. Polymers with higher release values make it increasingly difficult to use the tape and delamination of the adhesive from the substrate often can result. Coatings having release values less than 60 g/cm of width are useful as components for release liners. Many non-silicone polymers, e.g., urethanes, find use as low adhesion backsizes for pressure-sensitive tapes because of their much higher release force than the polydimethylsiloxanes, typically greater than 200 g/cm width. Such non-silicone LAB coatings are exemplified in U.S. Pat. Nos. 2,607,711, 2,876,894 and 3,342,625.

For products such as tapes and liners, coatings having specific release properties toward adhesives, which are intermediate between those of the polydimethylsiloxanes and conventionally used non-silicone LAB coatings, are highly desired. Many previous attempts to provide such coatings by modification of polydimethylsiloxanes or blending them with less effective release material, as disclosed in, for example, U.S. Pat. Nos. 3,328,482, 3,527,659, 3,770,687 and 3,891,745, have not met with total success because of many problems such as: (1) incompatability of components causing extensive migration of the silicone to the surface, (2) contamination of the adhesive with low molecular weight components giving adhesion loss, (3) nonreproducibility, e.g., inability to consistently achieve the desired release level, and (4) use of excessively high cure temperatures causing deterioration of the heat-sensitive substrate or tape backing.

Coating compositions exhibiting intermediate release properties towards adhesives, provided by reaction of an isocyanate with a hydroxyl or amine-containing organosiloxane, are described in U.S. Pat. No. 3,997,702.

Epoxypolysiloxanes have been previously used as polymer components to impart water repellency to textile and paper (U.S. Pat. Nos. 4,046,930 and 3,055,774), as treating agents for filling synthetic fiber (U.S. Pat. No. 4,062,999), as adhesion additives (U.S. Pat. No. 4,033,924), and in pre-crosslinked compositions, in which the epoxy group is present on a cycloalkylgroup, for rendering surfaces non-adherent (U.S. Pat. Nos. 4,279,717 and 4,421,904), in an abrasion-resistant layer in a multilayered sheet (U.S. Pat. No. 4,337,107), and in an abrasion resistant coating (U.S. Pat. No. 4,343,855).

Epoxypolysiloxanes have also been used in coatings for release liners. In U.S. Pat. No. 4,313,988 there are described differential release liners and low adhesion backsizes for tapes comprising cured epoxypolysiloxanes as represented by the formula

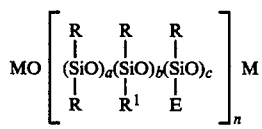

wherein
R is a lower alkyl of one to three carbon atoms,
$R^1$ is a monovalent hydrocarbyl radical of 4 to 20 carbon atoms,
E is a monovalent epoxy-containing hydrocarbon radical,
M is a silyl group $R_3Si—$, $R_2R^1Si—$, or $R_2ESi—$,
a is 5 to 200,
b is 0 to 20% of a,
a+b is 5 to 200,
c is up to 20% of a+b and
n is 1 to 5.

Also, ultraviolet radiation curable compositions for controlled release comprising epoxy functional dioganopolysiloxanes in which up to 20% of the groups are epoxy functional groups and an epoxy monomer are described in U.S. Pat. No. 4,547,431 and radiation curable release coatings are described in U.S. Pat. Nos. 4,576,999 and 4,640,967 wherein there is disclosed precrosslinked polyorganosiloxane containing units of

which R is $C_{(1-3)}$alkyl and G is independently $C_{1-3}$alkyl, an epoxy-functional organic radical of 2 to 20 carbon atoms, or an acrylic functional radical of 2 to 20 carbon atoms with at least one unit being epoxy- or acrylic-functional.

U.S. Pat. No. 4,684,709 describes epoxy substituted polysiloxanes and their use as treatment agents for paper, plastic films, etc. having the formula

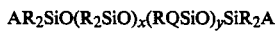

wherein R is a monovalent hydrocarbon or halogenated hydrocarbon group having from 1 to 10 carbon atoms, A is R or Q, Q is a group with the formula

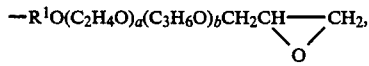

$R^1$ is an alkylene group having from 3 to 5 carbon atoms, a has an average value of 0 to 300 and b has an average value of 0 to 30, a+b has an average value of 2 to 60, x has an average value of 1 to 500 and y has an average value of 0 to 100, and containing at least 1 Q group in each molecule.

SUMMARY OF THE INVENTION

In none of the art discussed above or any other art of which Applicants are aware is it recognized that coating compositions that can be cured by actinic radiation and be useful in release liners can be provided by compositions containing epoxypolysiloxanes having a high epoxy content. As discussed above, U.S. Pat. No. 4,279,717 indicates that when the number of epoxy substituted siloxane groups is more than 12% of the non-epoxy substituted groups in the epoxypolysiloxane and U.S. Pat. No. 4,313,988 indicates that when the number of epoxy substituted siloxane groups is more than 20% of the non-epoxy substituted groups in the epoxypolysiloxane, that useful release coatings cannot be obtained.

Briefly, the present invention provides a composite structure comprising at least three layers including a substrate, a release layer, and an adhesive layer. The release layer comprises a cured layer of an epoxypolysiloxane in which an oxiranyl group-substituted, monovalent, non-cyclic, linear or branched aliphatic group is pendant on greater than 20%, preferably greater than 30%, of the siloxane units.

In a preferred embodiment, there is provided a composite structure comprising a substrate having a release layer on one or both sides of the substrate and an adhesive layer. The release layer can be coated, preferably at 100% solids, and cured by exposure to actinic radiation or heat and comprises an epoxypolysiloxane having a molecular weight of from 230 to about $1.5 \times 10^6$ and an average formula

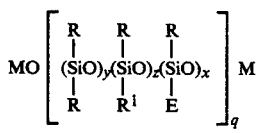

wherein

M is $R_3Si-$, $R_2ESi-$, or $R_2R^1Si-$;

R is a lower alkyl group of one to three carbon atoms;

$R^1$ is a monovalent hydrocarbyl group of 4 to 20 carbon atoms, preferably, an alkyl group of 4 to 8 carbon atoms;

E is an oxiranyl group-substituted monovalent linear or branched aliphatic group having two to 300 or more carbon atoms and optionally up to 100 or more non-peroxidic oxygen atoms, preferably E is selected from oxiranyl substituted aliphatic groups having the formulae

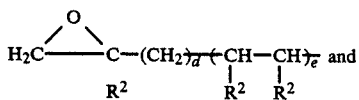

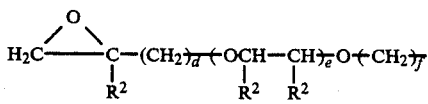

in which each $R^2$ is independently hydrogen or methyl,
each d is independently zero or one, and
each e is zero or a number having a value up to 300 or more,
f is zero or an integer having a value up to 20;
y is zero or a number having a value up to 200;
z is zero or a number having a value up to 20 percent of y;
y+z is zero or a number having a value up to 200;
x is zero or a number having a value up to 200; and
q is a number having a value of about 1 to about 75, with the provisos that when x is zero, M is $R_2ESi-$, and that the ratio of (x+the number of E groups in M) to (y+z) is a number greater than 0.2, preferably greater than 0.3.

Illustrative examples of the monovalent hydrocarbon group, $R^1$, in the above formula are alkyl groups such as butyl, isobutyl, tert-butyl, hexyl, octyl and octadecyl; aryl groups such as phenyl, naphthyl and bisphenyl; alkaryl groups such as tolyl and xylyl; aralkyl groups such as phenylmethyl, phenylpropyl and phenylhexyl; and cycloaliphatic groups such as cyclopentyl, cyclohexyl and 3-cyclohexylpropyl; and ether oxygen- or ester oxygen-containing groups such as ethoxypropyl, butoxybutyl, and ethoxycarbonylpropyl and the like. The preferred $R^1$ is alkyl of 4–8 carbon atoms.

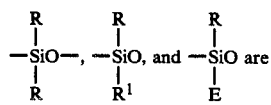

ordered or randomly arranged in the epoxypolysiloxane, and the monovalent epoxy-containing aliphatic group, E, contains at least one polymerizable epoxy group,

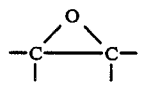

the remainder being composed of carbon and hydrogen, free of acetylenic unsaturation, and in addition to the oxirane oxygen can contain ether, —O—, oxygen.

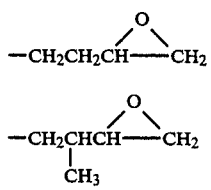

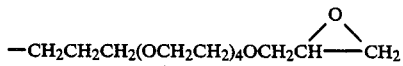

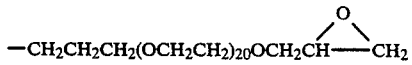

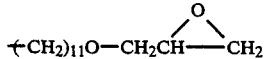

In this application:

"differential release liner" means a composite structure containing a support bearing on each surface a release coating, one coating having a release value towards an adhesive different from the other coating; preferably the difference in release values is at least 10 percent.

DETAILED DESCRIPTION OF THE INVENTION

The curable epoxypolysiloxanes useful in the coating compositions for providing the release layer of the invention can be fluids or much higher molecular weight greases or gums, and they can be cured with many types of epoxy curing catalysts well-known in the art in conjunction with actinic radiation and/or heat. Although fluids having average molecular weights ranging from about 1,000 to 20,000 are preferred because of handling performance and versatility of application, e.g., 100% solids or solution coatings can be used, compounds and polymers having molecular weights to $1.5 \times 10^6$ or more can be used, especially as solution coatings. Generally, the very high molecular weight polymers are less convenient to use because of their high solution viscosities. A further disadvantage is that they can exhibit lower pot life when mixed in solution with some of the more active catalysts. Viscosities of the epoxypolysiloxane ranging from about 50 to 3,000 centipoise, measured at 23° C. using a Brookfield viscometer, are preferred.

The epoxypolysiloxane coating composition of the invention, optionally, additionally can contain hydrolyzable epoxy-terminated silanes.

It is apparent from the restrictions placed on the epoxypolysiloxanes used in the coating compositions of the invention as described in Formula I, that not all types of epoxypolysiloxanes are useful for providing effective differential release coatings. U.S. Pat. No. 4,313,988, teaches that cured coatings of epoxypolysiloxanes having more than 20% of the siloxane units substituted by epoxy groups give a release toward adhesives that is very high and can be so high as to cause delamination of the adhesive from the substrate. U.S. Pat. Nos. 4,279,717 and 4,421,904 teach that when the epoxy content of the silicone compositions is greater than about 12 weight percent, excessive force is required to remove adhesive coated articles from the cured silicone coatings. In these patents, the experimental runs were performed using epoxypolysiloxane containing cycloaliphatic epoxides. Surprisingly, Applicants have discovered that when the oxirane group of the epoxypolysiloxane is located on a linear or branched alkyl group-substituted siloxane unit, and cycloaliphatic group-substituted siloxane units are avoided, that more than 20% of the siloxane units, in fact, up to 100% of the siloxane units present in the epoxy polysiloxane can contain an oxirane group and be useful in coating compositions from which release liners having desirable release characteristics can be made.

Furthermore, Applicants have discovered that the epoxypolysiloxanes in which more than 20 percent of the siloxane units have an epoxy group located on a linear or branched alkyl group have improved coatability onto substrates and increased adhesion of the coating to the substrate over epoxypolysiloxane compositions providing the same release values but containing epoxypolysiloxanes having less than 20 percent of the siloxane units with epoxy groups located on cycloaliphatic groups. In addition, the linear aliphatic epoxy compounds used in the preparation of the epoxypolysiloxanes of the invention are prepared with greater ease or use less toxic starting materials than the cycloaliphatic epoxies.

The epoxypolysiloxanes can be prepared by many methods known in the art such as the chloroplatinic acid catalyzed addition reaction of hydride functional siloxanes with non-cyclic, aliphatically unsaturated epoxy compounds, or the epoxidation of vinyl or like unsaturated siloxanes and Grignard type reactions as for example described by E. P. Plueddemann and G. Fanger, J. Am. Chem. Soc. 81, 2632–35 (1959). A convenient method is the hydrosiloxane addition reaction of non-cyclic unsaturated aliphatic epoxy compounds with poly(hydrosiloxanes). When this method is used, it is preferred that essentially complete reaction of the SiH sites are accomplished although small amounts of hydrogen attached to silicon can be present. It is also preferred for best results that the epoxypolysiloxane is essentially free from low molecular weight components such as cyclic siloxanes since their presence in the final cured coating could adversely affect the adhesion property of the adhesive (resulting in adhesive loss or buildup).

Representative examples of non-cyclic unsaturated aliphatic epoxy compounds that can be used in the preparation of the epoxypolysiloxanes include the following:

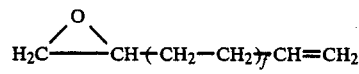

in which f is 1 to 300

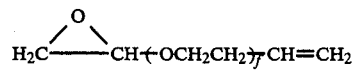

in which f is 1 to 300

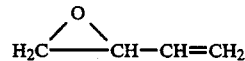

3,4-epoxybutene (or vinyloxirane)

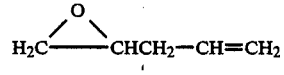

4,5-epoxy-1-pentene (or allyloxirane)

5,6-epoxy-1-hexene (or 4-butenyloxirane)

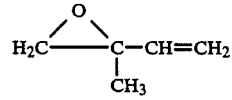

3,4-epoxy-3-methyl-1-butene (or 2-methyl-2-vinyloxirane)

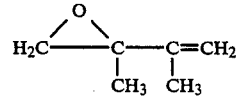

3,4-epoxy-2,3-dimethyl-1-butene (2-methyl-2-isopropenyl-oxirane)

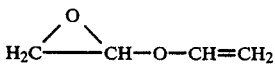

4,5-epoxy-3-oxa-1-pentene or (ethenyloxyoxirane via C.A. or oxiranyl vinyl ether

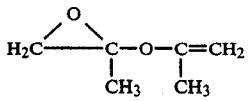

4,5-epoxy-2,4-dimethyl-3-oxa-1-pentene (or 2-methyl-2-isopropenyl-oxirane)

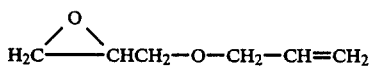

6,7-epoxy-4-oxa-1-hepene (or 4-oxaprop-4-enyloxirane) or 3-glycidyloxypropene or allyl glycidyl ether

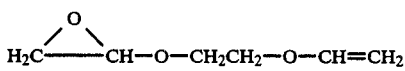

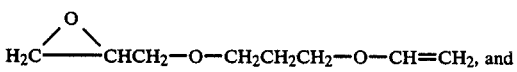

7,8-epoxy-3,6-dioxa-1-octene (or 3,6-dioxahex-5-enyloxyoxirane) or oxiranyl 3-oxapent-5-enyl ether $H_2C\underset{O}{\overset{}{\diagup\!\!\!\diagdown}}CHCH_2-O-CH_2CH_2CH_2-O-CH=CH_2$, and 10-11-epoxy-4,8-dioxa-1-undecene.

Preferred hydrosiloxanes of use in the preparation of the epoxypolysiloxanes are the hydrogen functional siloxanes having rhe general formula

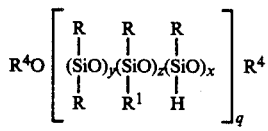   II wherein

R, $R^1$, x, y, z, and q are the same as defined in Formula I and $R^4$ is a silyl group selected from $R_3Si-$, $R_2R^1Si-$ and $R_2HSi$ in which R and $R^1$ are defined above, with the proviso that the ratio of (x+the number of H atoms in $R^4$) to (y+z) is a number greater than 0.20, preferably greater than 0.30.

The hydrosiloxanes are well known and are generally prepared, for example, by the equilibration of a mixture of polyhydromethylsiloxane (available from Dow Corning as DC ™ 1107) and octamethyltetracyclosiloxane (commonly designated $D_4$ ™, Dow Corning) with or without up to 20% of other alkylpolysiloxanes, and hexamethyldisiloxane or other hexalkyldisiloxanes in the presence of a strong mineral acid. By varying the ratios and nature of the siloxanes in the mixture, the range of hydrosiloxanes within the definition of Formula II can be prepared.

Curing of the epoxypolysiloxane-containing compositions of this invention can be effected by mixing with conventional epoxy curing catalysts and may require additional actinic radiation and/or heat. Examples of epoxy curing catalysts are tertiary amines, Lewis acids and their complexes, such as $BF_3$ and complexes with ethers and amines; antimony halide-phosphorus containing ester complexes, such as with organophosphonates as disclosed in U.S. Pat. Nos. 4,291,145 and 4,293,675; polyaromatic iodonium and sulfonium complex salts (e.g., having $SbF_6$, $SbF_5OH$, $PF_6$, $BF_4$, or $AsF_6$ anions, as disclosed in U.S. Pat. No. 4,101,513) and organic acids and their salts or other derivatives such as the highly fluorinated sulfonic and sulfonylic acids as described in U.S. Pat. No. 4,049,861; and ionic salts of organometallic complexes as disclosed in European Patent Office laid-open documents EP-A-O No. 094 914 and EP-A-O No. 094 915.

Not all catalysts are practical to use, however, because of such undesirable characteristics as: (1) high volatilty, (2) corrosiveness, (3) inability to provide latent coating solution, (4) inability to provide a totally cured coating at reasonable temperatures, e.g., below 130° C., required for heat-sensitive substrates, and (5) inability to provide adequate cure without use of excessive amounts of the catalyst which can cause contamination of the adhesive giving adhesive loss.

The preferred catalysts found useful to provide ideal release coatings for pressure sensitive adhesives are the supported photoinitiators for the actinic radiation-activated polymerization of cationically-polymerizable compounds described in U.S. Pat. No. 4,677,137. These initiators comprise a dispersible particulate carrier having a surface area of about 1 to 1000 square meteres per gram and a photocatalytic ionic salt of an onium or organometallic complex cation with a halogen-containing complex anion of a metal or metalloid. Further descripton of the supported photoinitiator is described in U.S. Pat. No. 4,677,137 which is incorporated herein by reference.

The amount of photocatalytic ionic salt in the radiation activated supported photoinitiator can range from about 0.005 to 5 parts by weight, preferably about 0.5 to 2 parts by weight of photocatalytic ionic salt per part by weight of particulate carrier. In the polymerizable compositions of the invention, about 0.005 to 20 parts, preferably 1.0 to 10 parts, of supported photoinitiator can be used per 100 parts of epoxypolysiloxane composition. The amount of supported initiator generally used will depend on the particular ionic salt, and particulate carrier present in the initiator and the particular epoxypolysiloxane used. At concentrations of catalyst composite above about 10 weight percent, the effect of the carrier becomes increasingly noticeable, e.g., in release coatings, the coatings exhibit decreasing release character. At concentrations of catalyst composite below about 3 weight percent the rate of polymerization becomes increasingly slower.

By the term "actinic radiation" is meant radiation having wavelengths in the 200 to 600 nm range, preferably 200 to 450 nm. Suitable sources include sunlight, carbon arcs, mercury vapor arcs, black light lamps, fluorescent lamps, argon and xenon glow lamps, electronic flash units and flood lamps. Depending on the concentration of catalyst composite, the particular epoxypolysiloxane, and the depth of the composition, exposures necessary to polymerize (which term includes crosslink and cure) the composition ranges from about 1 second or less to about 10 minutes or longer.

Where the activating radiation is above about 400 nm, it is desirable to include in the photoinitiator composite a radiation sensitizer such as 1,3-diphenylisobenzofuran or 1,3-diphenyl-2-pyrazoline. Other useful sensitizers are disclosed in U.S. Pat. No. 4,250,053.

As mentioned above, hydrolyzable epoxy-terminated silanes can be used in the coating compositions of the invention. The use of such compounds enables the release performance of the coating to be varied. The epoxy-terminated silanes are compounds or materials having polymerizable epoxy group(s) and a polymerizable silane group, the bridging of these groups being through a non-hydrolyzable aliphatic, aromatic or aromatic and divalent aliphatic hydrocarbon linkage which may contain ether or carbonyl oxygen linking groups. The hydrolyzable epoxy-terminated silane is represented by the formula

$$(E')_{4-p}Si-OR^5)_p$$

wherein $E'$ is any epoxy-containing monovalent organic group which can be, for example, any linear, branched, or cyclic aliphatic epoxy-containing monovalent organic group, p is an integer 1 to 3 (preferably 3) and $R^5$ can be an aliphatic radical of less than 10 carbon atoms such as alkyl (methyl, ethyl, isopropyl, butyl), an alkenyl such as allyl or vinyl, or an acyl radical such as formyl, acetyl, or propionyl. Because of availability and performance, the preferred $R^5$ is a lower alkyl such as methyl or ethyl. Many illustrative examples are described in U.S. Pat. No. 4,049,861. The preferred silanes are beta-(3,4-epoxycyclohexyl)ethyltrimethoxysilane and glycidyloxypropyltrimethoxysilane both of which are available from Dow Chemical Co.

In addition to the silane, any hydrolyzate of the above silanes can be used. The hydrolyzate is formed by partial or complete hydrolysis of the silane $OR^5$ groups as described further in the above patent.

The amount of the hydrolyzable epoxy-terminated silane or hydrolyzate can range from 0 to about 98% of the total weight of the epoxypolysiloxane coating composition, the amount being determined by the release performance desired. Generally the higher amounts give the higher release values. Use of amounts greater than about 98% were found to be impractical. For example, use of 100% of the hydrolyzable epoxy-terminated silane, i.e., no epoxypolysiloxane present where $R^5$ is methyl, p=3, and E is beta(3,4-epoxycyclohexyl-)ethyl, gave a hard abrasion-resistant coating, but the release toward an acrylic adhesive was found to be excessively high, causing delamination of the adhesive from the substrate.

In the practice of the invention, the epoxypolysiloxane, the catalyst, and optionally, the hydrolyzable epoxy-terminated silane are mixed and, when needed to provide a viscosity suitable for coating, an organic solvent added. When the catalyst is a thermally initiated catalyst, it is used at a concentration of about 1 to 5% by weight of the epoxy compounds used in the coating composition. The resultant composition is coated onto the substrate and cured at ambient temperatures or, where necessary, heated at temperatures of 25° to 150° C. When the catalyst is the preferred supported photoinitiator, it is used at a concentration of about 1 to 20%, preferably 2 to 10% by weight of the epoxy compounds used in the coating composition. The composition is coated onto the substrate and exposed to 0.05 to about 1.5 joules per square centimeter of actinic radiation, generally requiring about 1 to 10 seconds of exposure time. It is sometimes desirable to apply heat during or after the irradiation. Application of radiation followed by heating is also known, in the art, as two-stage curing.

Solvents which can be used include ethyl acetate, isopropyl acetate, acetone, methyl ethyl ketone, heptane, toluene, and mixtures thereof. The exact coating technique is not especially critical and any of several well known procedures can be used. Wirewound rods, such as a Meyer bar, or a rotogravure applicator roll having, for example, 80 lines per cm, provide uniform coatings. Optionally, a mixing spray nozzle having a line for the epoxypolysiloxane fluid or solution and a separate line for the catalyst solution can be used.

Substrates to which the release layer of the invention can be applied include organic substrates of wood, fiberboard, particle board, paper and cardboard; woven and non-woven organic and inorganic fibers; synthetic and natural polymers such as polyolefins, polyesters, polyamides, cured phenolics, urea-aldehyde resins, poly(vinyl halides), polyacrylates, polyurethanes, proteins, rubber; inorganic substrates which include metals such as iron, stainless steel, copper, brass, bronze aluminum, titanium, nickel, zinc, and alloys.

The solventless actinic radiation-curable compositions of the invention are particularly suitable for preparing release liners of use with adhesive roll and sheet materials. For this use, a substrate of paper or a film of polymer such as, for example, polyester, polyamide, polyolefin, etc. is used as the tape backing.

The initial release performance of the epoxypolysiloxane coating toward adhesives can be measured by various methods known in the art depending upon whether the final product is in sheet or rolled form such as a tape. Various test methods for pressure-sensitive tapes are reported by the Pressure Sensitive Tape Council (PSTC), "Test Methods for Pressure Sensitive Tapes" (several editions).

Objects and advantages of this invention are further illustrated by the following examples, but the particular materials and amounts thereof recited in these examples, as well as other conditions and details, should not be construed to unduly limit this invention.

EXAMPLES 1-7

High functionality epoxypolysiloxanes were prepared in accordance with the following procedure:

A hydride functional silicone oligomer was prepared by equilibration of a mixture of 493.7 g (7.71 equivalents of CH$_3$HSiO) of polyhydromethyl siloxane (available as DC 1107 TM from Dow Corning)

2000 g (26.97 equivalents of (CH$_3$)$_2$SiO) of octoamethylcyclotetrasiloxane 46.1 g (0.28 moles) of hexamethyldisiloxane by heating with 2.6 g conc. sulfuric acid and 13.7 g activated carbon black at 100° C. for 16 hours, filtering, and removing volatiles under high vacuum at 200° C. The product obtained was a clear colorless liquid with a measured Si-H equivalent weight of 322 grams/equivalent.

Into a 3 liter 3-neck flask equipped with condenser, mechanical stirrer, thermometer, addition funnel, and rubber septum was placed 800 g of the hydride-functional silicone oligomer prepared above along with 1200 g of hexane.

Into the addition funnel was placed 399 g of allyl glycidyl ether, and a solution of 0.22 g of 15% platinum in divinyl tetramethyldisiloxane in 2.0 ml hexane was placed in a syringe pump assembly.

The flask and contents were heated to 60° C. under nitrogen atmosphere, and addition of the allyl glycidyl ether was started at such a rate to add the entire charge over a 1 hour period. The platinum solution was added at 1.7 ml/hr through the rubber septum. After one hour, the allyl glycidyl ether addition was complete, and the platinum addition was stopped. The reaction was allowed to stir for 2 hours at 60° C. After cooling, the solvent and excess allyl glycidyl ether were removed under reduced pressure, and last traces of volatiles were removed by heating the reaction mixture at 80° C./0.1 mm Hg for two hours. The product obtained was a clear straw-colored liquid having a measured epoxy equivalent weight (EEW) of 482 and a viscosity at 25° C. of 482 centipoise.

By changing the ratios of the three siloxane starting materials used, various hydride functional silicone oligomers can be prepared from which epoxypolysiloxanes of the formula

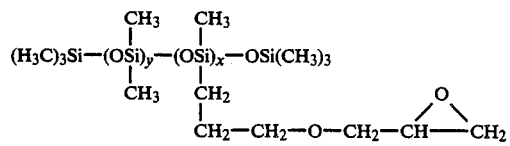

in which the ratio x/y can be varied from 0.2 to infinity and a viscosity at 25° C. from about 50 to 100,000 centipoise can be obtained.

Table I lists some representative epoxypolysiloxanes prepared by this method.

TABLE I

| Example | EEW | x + y | x/y | Viscosity (cps) |
|---|---|---|---|---|
| 1 | 545 | 70 | 0.2 | 300 |
| 2 | 482 | 70 | 0.25 | 440 |
| 3 | 439 | 70 | 0.29 | 419 |
| 4 | 332 | 70 | 0.5 | 955 |
| 5 | 315 | 50 | 0.5 | 610 |
| 6 | 250 | 40 | 1.0 | 610 |
| 7 | 185 | 35 | ∞ | 484 |

EXAMPLE 8

Coatings for testing release properties of the epoxypolysiloxanes were prepared by mixing 95 parts of the epoxypolysiloxane with 5 parts of the silica-supported triphenylsulfonium hexafluoroantimonate, prepared as described in U.S. Pat. No. 4,677,137, in a blender under high shear conditions. The creamy white suspension obtained was coated onto biaxially oriented polypropylene (BOPP) using an offset gravure coating head, and the coating was cured by passing under four medium pressure mercury lamps to give a total radiation dose of about 0.5 joule per square centimeter.

Adhesive laminates for testing the release liners were prepared by wet casting a solvent-based acrylic copolymer pressure sensitive adhesive directly onto the release liner, drying at 70° C. for five minutes, and laminating a 2 mil (0.05 mm) polyester film to the adhesive layer. The laminates were tested by peeling the polyester (with adhesive) from the release liner at a 180° angle at 230 cm/minute (90 inches/minute). "Initial release values" reported are those obtained when the liner/adhesive/polyester laminate is tested after 3 days at room temperature. "Aged" release values refer to laminates which have been subjected to accelerated aging conditions of 3 days at 70° C.

Adhesion of the release coatings to substrates was measured after aging at room temperature and 95% relative humidity for at least one week. Resistance to rub-off with heavy thumb pressure was measured and assigned a value of 1 to 5, with 5 signifying no rub-off and 1 signifying very easy rub-off.

Coating quality was similarly assigned a value of 1 to 5 with 5 being a clear, smooth, homogenous appearing coating and 1 being a mottled coating with a significant amount of dewetting.

Table II lists the release results for selected epoxypolysiloxanes prepared according to this invention.

TABLE II

| Example | EEW | x/y | Release Initial | (2.5 cm) Aged | Adhesion to BOPP | Coating Quality |
|---|---|---|---|---|---|---|
| 1 | 545 | 0.20 | 13 | 19 | 5 | 4 |
| 2 | 482 | 0.25 | 17 | 19 | 5 | 4 |
| 3 | 445 | 0.29 | 24 | 25 | 5 | 5 |
| 4 | 322 | 0.50 | 124 | 190 | 5 | 5 |
| 6 | 250 | 1.0 | 168 | 285 | 5 | 5 |
| 7 | 185 | ∞ | 1600 | * | 5 | 5 |

*adhesive separated from polyester

Table II shows that cured epoxypolysiloxanes having oxiranyl groups on a linear aliphatic group in which the ratio of oxiranyl groups to non-oxiraryl groups is between 0.2 and 1.0 are useful as release surfaces for acrylic adhesives.

COMPARATIVE EXAMPLES A, B, and C

Epoxypolysiloxanes containing pendant cycloaliphatic epoxy groups were prepared by the same procedure outlined in Example 1, substituting 3-vinyl-7-oxabicyclo[4.2.0]heptane in place of the allyl glycidyl ether. The final products were straw-colored liquids having the formula

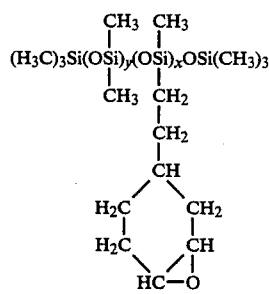

These materials were coated, cured and tested in a manner identical as outlined in Example 8. The results of these tests are given in Table III and indicate quite clearly the superior nature of the pendant glycidoxypropyl groups of this invention relative to the cylcloaliphatic groups with respect to the combination of usable release values, adhesion to substrate and coatability.

TABLE III

| Example | EEW | x/y | Release (2.5 cm) Initial | Aged | Adhesion to BOPP | Coating Quality |
|---|---|---|---|---|---|---|
| A | 884 | 0.11 | 26 | 25 | 3 | 2 |
| B | 560 | 0.2 | 97 | 88 | 4 | 4 |
| C | 453 | 0.29 | 1350 | # | 5 | 5 | adhesive delaminated from polyester

Table III shows that cured epoxypolysiloxanes having oxiranyl groups on a cycloaliphatic group in which the ratio of cycloaliphatic groups to non-oxiranyl groups is above 0.2 are not useful as release surfaces for acrylic adhesives.

EXAMPLE 9

This example illustrates the effect of replacing some of the dimethylsiloxy units with methyl(octylsiloxy) units in the high epoxy content epoxypolysiloxanes.

A hydride functional siloxane of Si-H equivalent weight 322 was hydrosilated as outlined in Example 1, using a mixture of allyl glycidyl ether and 1-octene in a ratio of 3 moles of allyl glycidylether to 1 mole of 1-octene. The final product had an EEW=510 and a viscosity of 416 centipoise and had the average formula:

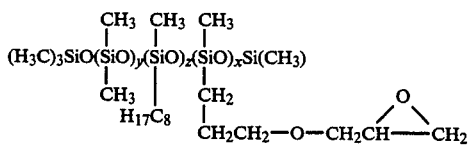

This material was coated and cured as outlined in Example 8 and adhesive laminates were prepared as outlined in Example 8 Table IV compares the release behavior of this material with that of epoxypolysiloxanes of similar EEW containing no methyl(octylsiloxy) units.

TABLE IV

| Example | x | y | z | x/y + z | EEW | Release initial | (g/2.5 cm) aged |
|---|---|---|---|---|---|---|---|
| 8 | 12 | 54 | 4 | 0.21 | 510 | 35 | 38 |
| 1 | 12 | 58 | 0 | 0.21 | 545 | 13 | 19 |
| 2 | 14 | 56 | 0 | 0.25 | 482 | 17 | 19 |

Table IV shows that surfaces of cured epoxypolysiloxanes having 4 to 58 non-oxiranyl groups substituted by octyl groups and a ratio of 0.21 oxiranyl groups on linear aliphatic to non-oxiranyl groups provide excellent release for acrylic adhesive.

EXAMPLE 10

This example illustrates the utility of the epoxysilicones of this invention when used with a rubber adhesive in a tape construction.

Epoxypolysiloxanes of EEW=439 (Example 3) and EEW=332 (Example 4) were coated onto cast polypropylene film and cured under ultraviolet radiation. This film was immediately coated on the backside with a hot-melt tackified styrene-isoprene block copolymer pressure sensitive adhesive, and the material was rolled up onto itself so that the adhesive came into intimate contact with the cured epoxypolysiloxane coating.

The unwind values of these samples were obtained by measuring the force required to pull the tape from the roll at an angle of 90° to the tangent to the point of unwind. The material of EEW=439 gave an unwind value of 130 grams per 2.5 cm (inch) of width, and the material of EEW=332 gave an unwind value of 180 grams per 2.5 (inch) of width.

Various modifications and alterations of this invention will become apparent to those skilled in the art without departing from the scope and spirit of this invention, and it should be understood that this invention is not to be unduly limited to the illustrative embodiments set forth herein.

We claim:

1. A composite structure comprising a substrate bearing on one or more surfaces a layer comprising an epoxypolysiloxane in which greater than 20% of the siloxane units are substituted by an oxiranyl group-substituted monovalent, non-cyclic, linear or branched aliphatic group, said epoxypolysiloxane being free of epoxy containing cycloaliphatic group-substituted siloxane units.

2. A composite structure comprising a substrate bearing on one or more surfaces a layer comprising an epoxypolysiloxane in which the epoxypolysiloxane has the formula

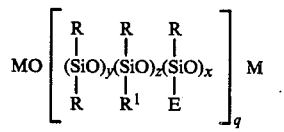

wherein R is a lower alkyl group having one to three carbon atoms,

R$^1$ is a monovalent hydrocarbyl group of 4 to 20 carbon atoms;

E is an oxiranyl group-substituted monovalent linear or branched aliphatic group;

M is a silyl group selected from R$_3$Si—, R$_2$R$^1$Si—, and R$_2$ESi— in which R, R$^1$, and E are defined above;

y is zero or a number having a value up to 200;

z is zero or a number having a value up to 20 percent of y;

y+z is zero or a number having a value of up to 200;

x is zero or a number having a value up to 200; and q is a number having a value of 1 to 75, with the provisos that when x is zero, M is R$_2$ESi—, and the ratio of (x plus the number of E groups in M) to (y+z) is greater than 0.2, and said epoxypolysiloxane being free of epoxy containing cycloaliphatic group-substituted siloxane units.

3. The composite structure of claim 2 in which E is selected from oxiranyl group-substituted groups having the formulae

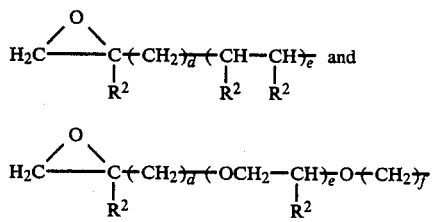

in which each R$^2$ is independently hydrogen or methyl, each d is independently zero or one, and e is zero or a number having a value up to 300, and f is zero or an integer having a value up to 20.

4. The composite structure of claim 3 in which R$^2$ is hydrogen and e is zero or one.

5. The composite structure of claim 3 in which E is

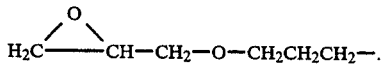

6. The composite structure of claim 1 wherein the substrate is selected from the group consisting of at least one of wood, paper, woven and non-woven organic and inorganic fibers, synthetic and natural polymers, and metals.

7. The composite structure according to claim 6 wherein said substrate is a tape backing.

8. The composite structure according to claim 1 wherein said layer of epoxypolysiloxane further comprises at least one hydrolyzable epoxy-terminated silane or hydrolyzate thereof in an amount in the range of more than zero and up to 98 weight percent of the layer.

9. The composite structure according to claim 8 wherein said hydrolyzable epoxy-terminated silane has the formula $$(E')_{4-p}Si-(OR^5)_p$$

wherein E' is any epoxy-containing monovalent organic group, p is an integer 1 to 3, and $R^5$ is an aliphatic hydrocarbon having less than 10 carbon atoms.

10. The composite structure according to claim 1 wherein said layer of epoxysiloxane further comprises an effective amount of a curing catalyst.

11. The composite structure according to claim 10 wherein said catalyst is a supported ionic salt of an onium or organometallic complex cation.

12. The composite structure according to claim 1 wherein said layer of epoxysiloxane further comprises an effective amount of a radiation sensitizer.

13. The composite structure according to claim 1 which has been cured by application of at least one of actinic radiation and heat.

14. The composite structure according to claim 1 which is a release liner.

15. The composite structure according to claim 1 which is a differential release liner.

16. The composite structure of claim 1 further comprising a layer of adhesive.

17. The composite structure of claim 16 wherein said adhesive is a pressure sensitive adhesive.

18. The composite structure according to claim 1 wherein greater than 30% of the siloxane units of said epoxysilane are substituted by an oxiranyl group-substituted monovalent, non-cyclic, linear or branched aliphatic group.

19. The composite structure according to claim 1 wherein said layer comprising said epoxypolysiloxane further comprises an organic solvent.

20. The composite structure of claim 1 in which the epoxypolysiloxane has the formula

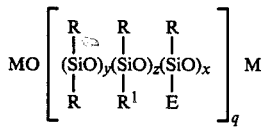

wherein

R is a lower alkyl group having one to three carbon atoms, $R^1$ is a monovalent organic group containing 4 to 20 carbon atoms and at least one oxygen atom in which the oxygen atom is part of an ether or ester group;

E is an oxiranyl group-substituted monovalent linear or branched aliphatic group;

M is a silyl group selected from $R_3Si-$, $R_2R^1Si-$, and $R_2ESi-$ in which R, $R^1$, and E are defined above;

y is zero or a number having a value up to 200;

z is zero or a number having a value up to 20 percent of y;

y+z is zero or a number having a value of up to 200;

x is zero or a number having a value up to 200; and q is a number having a value of 1 to 75, and the provisos that when x is zero, M is $R_2ESi-$, and the ratio of (x plus the number of E groups in M) to (y+z) is greater than 0.2.

21. The composite structure according to claim 1 wherein greater than 30% of said siloxane units of said epoxypolysiloxane are substituted by an oxiranyl group-substituted monovalent, non-cyclic, linear or branched aliphatic group.

22. The composite structure according to claim 1 wherein the ratio of epoxy-containing to non epoxy-containing siloxane groups is in the range 0.25/1 to 1.00/1.

23. The composite structure according to claim 1 wherein the ratio of epoxy-containing to non epoxy-containing siloxane groups is in the range of 0.29/1 to 1.00/1.

* * * * *

UNITED STATES PATENT AND TRADEMARK OFFICE
CERTIFICATE OF CORRECTION

PATENT NO. : 4,822,687

DATED : April 18, 1989

INVENTOR(S) : Carl R. Kessel, et al.

It is certified that error appears in the above-identified patent and that said Letters Patent is hereby corrected as shown below:

Col. 2, line 43, insert -- in -- before "which".

Col. 4, line 21, after "atoms." insert -- The siloxane groups, --.

Col. 4, line 40, after "oxygen." insert -- Illustrative examples of E are: --.

Col. 7, line 40, delete "rhe" and insert therefor -- the --.

Signed and Sealed this

Thirtieth Day of January, 1990

Attest:

JEFFREY M. SAMUELS

Attesting Officer

Acting Commissioner of Patents and Trademarks